United States Patent
Nelson et al.

(10) Patent No.: US 8,584,275 B2
(45) Date of Patent: Nov. 19, 2013

(54) PATIENT LIFTER

(75) Inventors: Richard L. Nelson, Newburgh, IN (US); Robert M. Levy, Terre Haute, IN (US)

(73) Assignee: Rehabilitation Research of Evansville, Inc., Evansville, IN (US)

( * ) Notice: Subject to any disclaimer, the term of this patent is extended or adjusted under 35 U.S.C. 154(b) by 838 days.

(21) Appl. No.: 12/606,967

(22) Filed: Oct. 27, 2009

(65) Prior Publication Data

US 2010/0107329 A1 May 6, 2010

Related U.S. Application Data

(60) Provisional application No. 61/108,694, filed on Oct. 27, 2008.

(51) Int. Cl.
*A61G 7/10* (2006.01)

(52) U.S. Cl.
USPC .................. 5/87.1; 5/83.1; 5/85.1; 5/81.1 R

(58) Field of Classification Search
USPC .............................. 5/81.1 R, 83.1, 87.1, 85.1
See application file for complete search history.

(56) References Cited

U.S. PATENT DOCUMENTS

| | | | | |
|---|---|---|---|---|
| 662,725 A | * | 11/1900 | Hepburn | ......................... 49/436 |
| 2,821,406 A | * | 1/1958 | Hoyer et al. | ................. 280/657 |
| 3,104,399 A | * | 9/1963 | Dalton | ............................ 4/562.1 |
| 4,554,691 A | * | 11/1985 | Daugherty | ....................... 5/87.1 |
| 4,606,082 A | | 8/1986 | Kuhlman | |
| 4,682,377 A | | 7/1987 | Reich | |
| 5,077,844 A | | 1/1992 | Twitchell et al. | |
| 5,369,821 A | | 12/1994 | Richards et al. | |
| 5,388,289 A | * | 2/1995 | Casperson | ....................... 5/86.1 |
| 5,459,891 A | | 10/1995 | Reeve et al. | |
| 5,560,054 A | | 10/1996 | Simon | |
| 5,682,630 A | | 11/1997 | Simon | |
| 5,784,729 A | | 7/1998 | Dunn et al. | |
| 5,845,348 A | | 12/1998 | Dunn et al. | |
| 6,068,225 A | * | 5/2000 | O'Brien et al. | ............ 248/200.1 |
| 6,213,435 B1 | * | 4/2001 | Minet | ........................ 248/125.8 |
| 6,694,545 B1 | | 2/2004 | Renton | |
| 6,718,573 B2 | | 4/2004 | Von Schroeter | |
| 6,857,144 B1 | * | 2/2005 | Huang | ............................. 5/86.1 |
| 6,964,070 B2 | | 11/2005 | Hawk et al. | |

(Continued)

FOREIGN PATENT DOCUMENTS

| | | |
|---|---|---|
| DE | 3707005 | 9/1988 |
| GB | 2323348 | 9/1998 |
| WO | 2007080147 | 7/2007 |

*Primary Examiner* — William Kelleher
(74) *Attorney, Agent, or Firm* — Douglas G. Gallagher; Bingham Greenebaum Doll LLP

(57) ABSTRACT

A device and associated method transfer a person having a handicap from one location to another, such as into or out of a wheelchair, bed, or bathtub. A wheeled base provides mobility to the device. A post and lifter arm support the patient during the transfer. The post is connected to a stabilization arm, which temporarily connects using a stabilization interface to a stabilization bracket. The stabilization bracket is typically attached rather permanently to a wall, ceiling, or other structural feature that provides substantial stability to the system. In various embodiments, the lifter arm may be actuated by hydraulics, the stabilization arm may be extendable, and a pair of extra wheels on the mobility base are adjustable horizontally (e.g., along one hedge of the base frame) or vertically (down to decrease the load on the casters, or up to allow the lifter to be "crabbed" sideways in confined spaces).

26 Claims, 10 Drawing Sheets

(56) References Cited

U.S. PATENT DOCUMENTS

| | | |
|---|---|---|
| 7,178,181 B1 | 2/2007 | Fulmer |
| 7,694,360 B2 * | 4/2010 | Tally ................................ 5/86.1 |
| 2005/0217024 A1 * | 10/2005 | Aarestad .......................... 5/86.1 |
| 2006/0075552 A1 | 4/2006 | Diggins |
| 2007/0220671 A1 * | 9/2007 | Vanderheiden et al. ..... 5/81.1 R |
| 2010/0132114 A1 * | 6/2010 | Becker .............................. 5/87.1 |
| 2011/0016628 A1 * | 1/2011 | Masterson, Jr. .................. 5/87.1 |

* cited by examiner

PATIENT LIFTER

REFERENCE TO RELATED APPLICATION

This application is a non-provisional of U.S. Provisional Application No. 61/108,694, filed Oct. 27, 2008 with title "Patient Lifter with Variable Height, Variable Load Bearing, and Variable Horizontal Position Drive Wheels," pending.

FIELD

The present invention relates to land vehicles. More particularly, it relates to movable devices with patient transfer features.

DESCRIPTION

For the purpose of promoting an understanding of the principles of the invention, reference will now be made to certain embodiments illustrated in the disclosure, and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
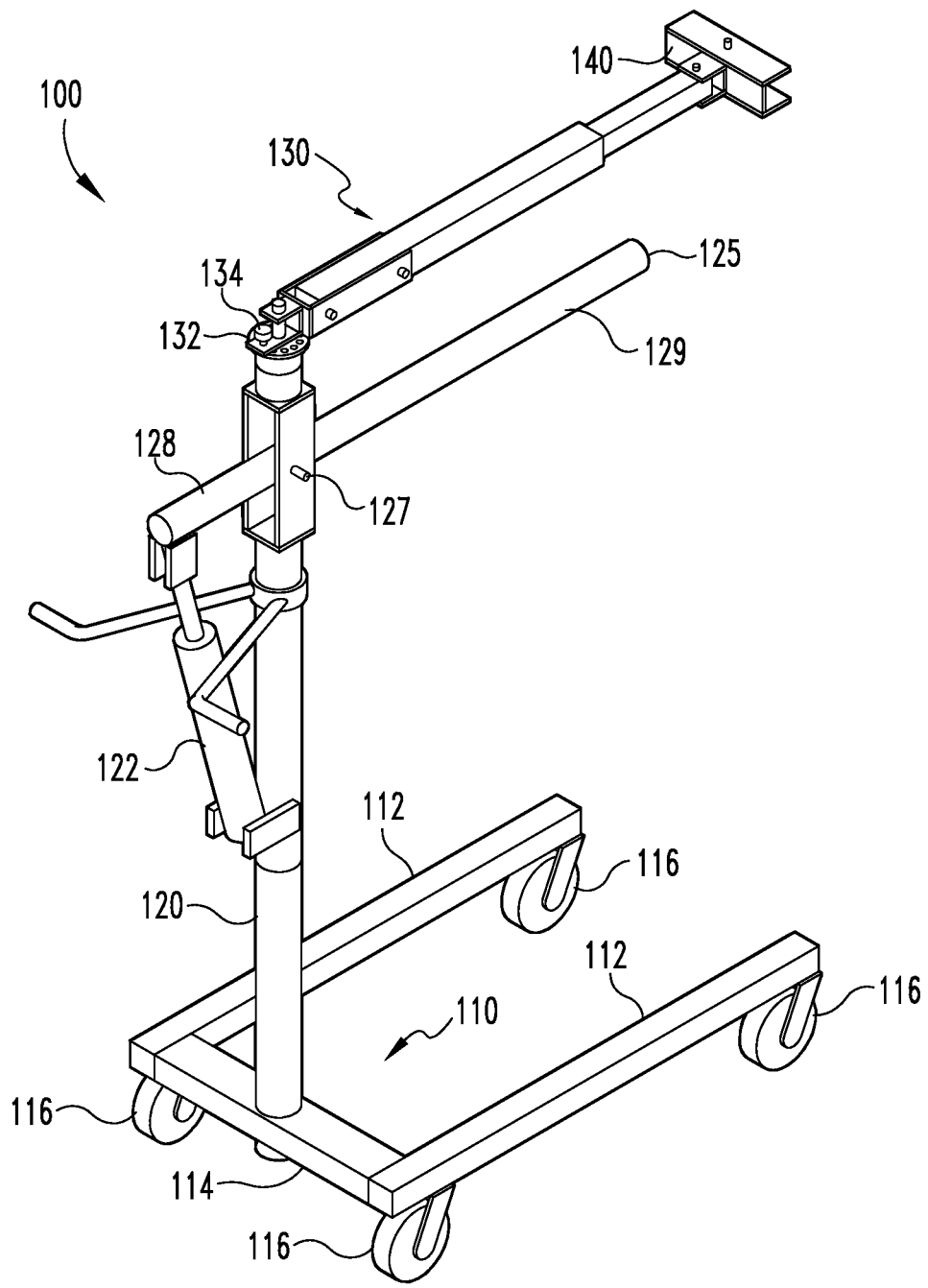
FIG. 1 is a perspective view of a patient transfer device according to one embodiment of this disclosure.

Generally, this disclosure relates to a device and an associated method for transferring a person having a handicap from one location to another, such as transferring between a wheelchair and a bathtub, or between a wheelchair and a bed. One embodiment described herein includes five major components: a mobility base, a post and lifter arm, a stabilization arm, a stabilization interface, and a stabilization bracket. A perspective view of this embodiment is shown in FIG. 1.

Mobility base 110 comprises a tubular frame with side members 112 and cross member 114, with casters 116 attached to effect mobility of the lifter 100. The casters 116 can all be locked, when required, for positional stability of the lifter 100. Each caster 116 swivels when unlocked. The casters 116 lock and unlock simultaneously upon activation of a single lever, footpad, or other control mechanism (not shown). When casters 116 are locked, they can neither swivel about the caster stem bearings, nor roll about the caster axles. The base side pieces 112 and 114 can be moved so as to increase the width of the base to optimize lifter stability when desired, or to effect transfers from wider wheelchairs, lift chairs, or the like.

Lifter post 120 is attached to a cross member 114 of the mobility base frame 110. The lifter post 120 in this embodiment is removable from the base to allow for shipping, transporting in a vehicle, storage, and the like. The post can be attached at multiple locations along the cross member 114 of the base frame 110 in order to reduce the required length of the lifter arm 125 and stabilization arm 130. Attached to the lifter post 120 is a lifter arm 125. The lifter arm 125 is attached to the post 120 with an offset pivot point 127 (so it has a short end 128 and a long end 129) so it pivots up and down to allow a client to be lifted over the wall of a bathtub, off of a bed, etc. while hanging from the long end 129 of the lifter arm 125 in a sling (not shown). An actuator device 122 is attached to the short end 128 of the lifter arm 125 and to a position on lifter post 120 below pivot point 127, to provide the mechanical push and pull required to pivot (raise or lower) the lifter arm 125 as required during use. The actuator device 122 and lifter arm 125 are attached to the post in such a way that they can pivot 360 degrees about the post 120 to perform side and rear transfers as required. Push handles 124 for maneuvering the lifter are also attached to the lifter post 120.

Figure 2:
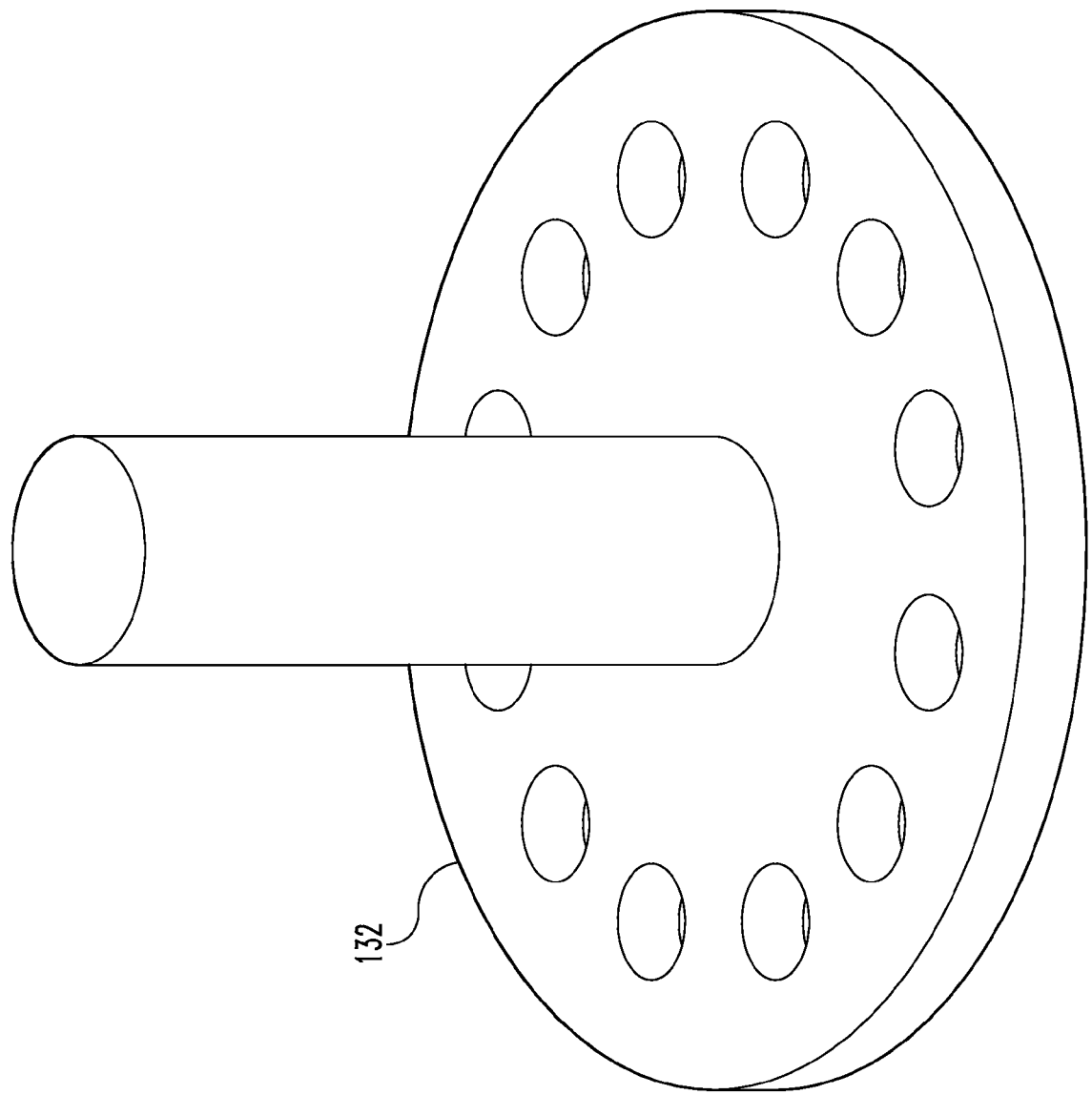
FIG. 2 is a perspective view of an indexed linkage means for use in the system of FIG. 1.
Figure 3:
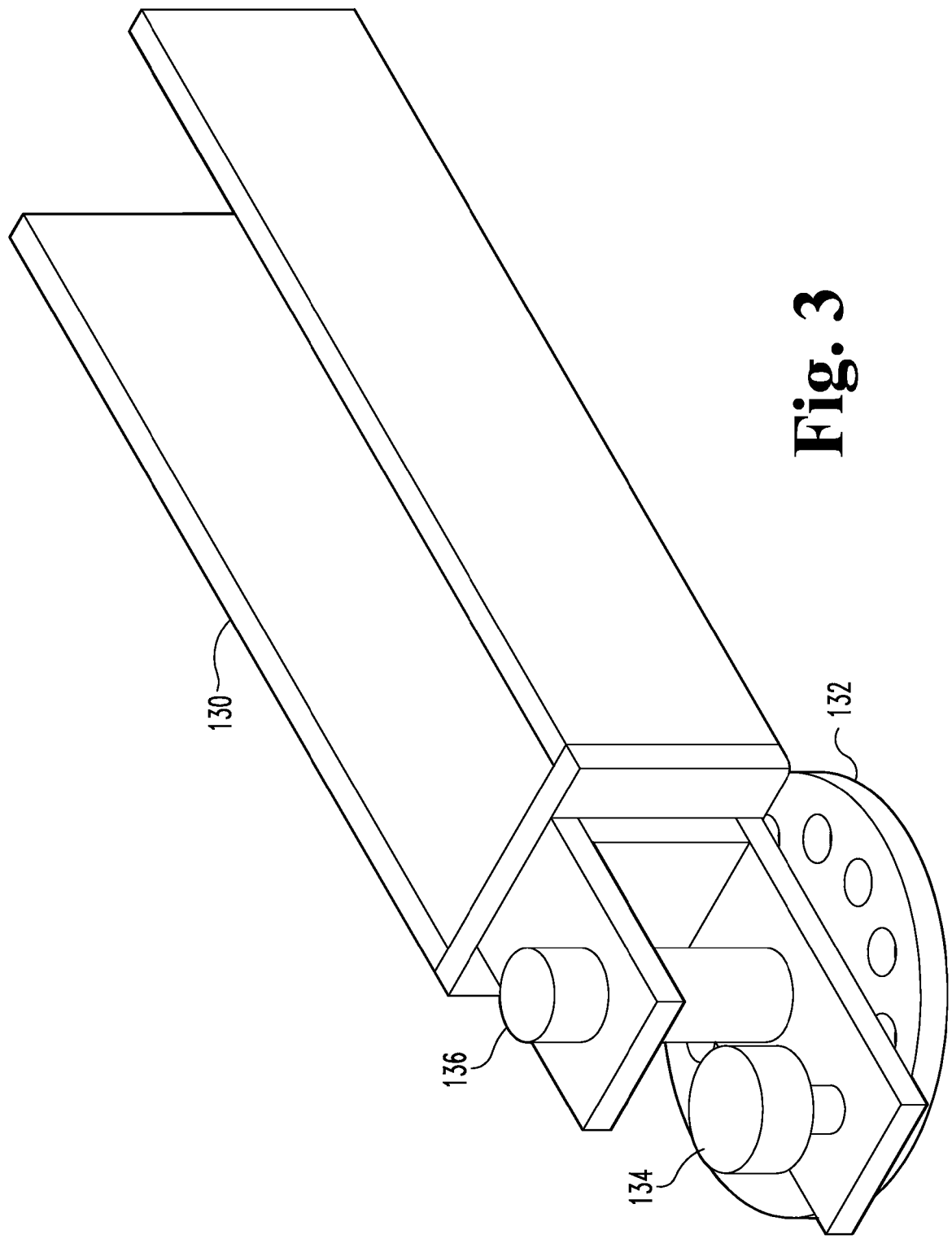
FIG. 3 is a perspective view of a stabilization arm connection for use in the system of FIG. 1.

A stabilization arm 130 is attached to the lifter post 120 in a way that allows it to be rotated 360 degrees about indexed linkage means 132 at the top of the lifter post 120, and is securely indexed at multiple angles to the post to effect transfers in multiple relative angular configurations. (See also FIGS. 2-3.) The stabilization arm 130 is designed to fold out of the way when not in use, or to be detached if the device is being used only as a traditional lifter. The stabilization arm is adjustable in length to effect transfers in multiple configurations and situations. The attachment point of stabilization arm 130 to the lifter post 120 can be varied in height to effect transfers in multiple configurations.

Figure 4:
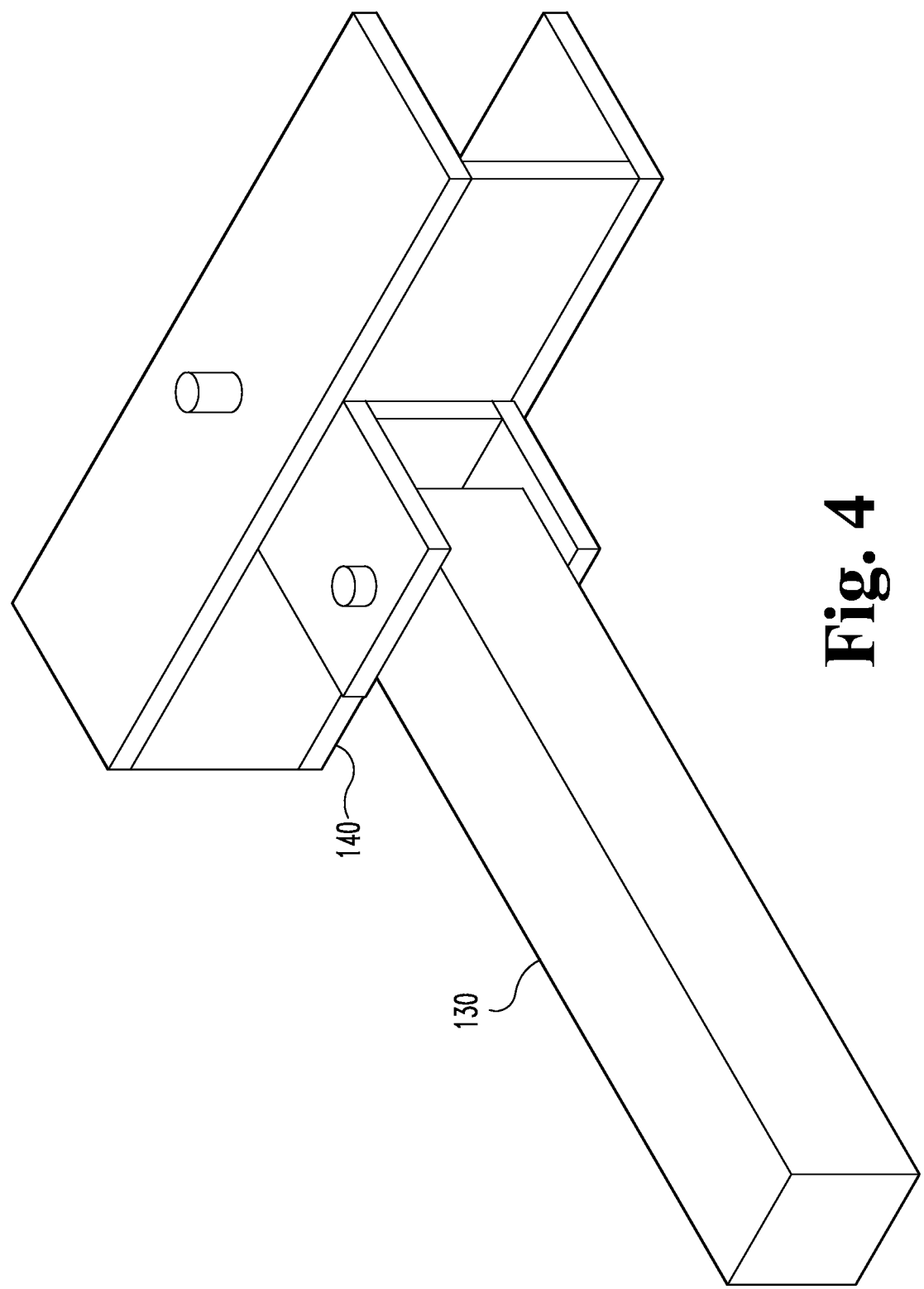
FIG. 4 is a perspective view of a stabilization interface device for use in the system of FIG. 1.

A stabilization interface device 140 is attached to the end of the stabilization arm 130 opposite to the post attachment point. As illustrated in FIG. 4, the stabilization interface device 140 is attached pivotally to the stabilization arm 130 to allow stabilization of the lifter in multiple configurations. It contains a mechanism that assures a rigid, safe connection with the stabilization bracket 150 (see FIG. 5). This attachment is robust, but is easily engaged and disengaged. In some embodiments, once the transfer is complete, the stabilization interface device 140 can be remotely detached from the stabilization bracket 150 so the lifter can be moved. This remote detachment is enabled in various embodiments by cables, pulleys, levers, motors, servos, and other mechanisms and techniques as will occur to those skilled in the relevant areas of technology in light of this disclosure.

Figure 5:
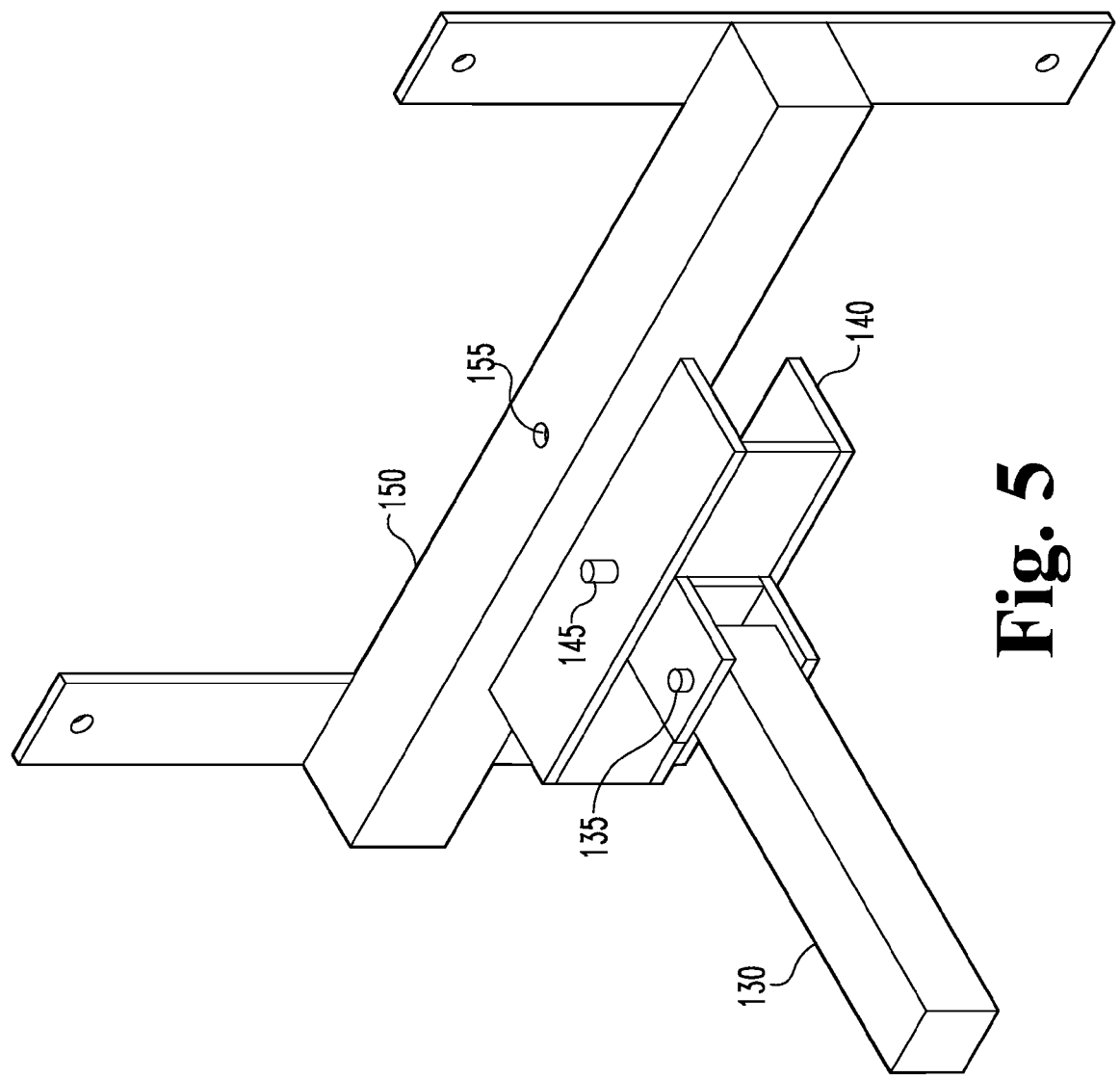
FIG. 5 is a perspective view of a stabilization bracket and interface device for use with the system of FIG. 1.

As shown in FIG. 5, a stabilization bracket 150 is securely attached to a wall in the vicinity of the transfer site. The stabilization interface device 140 on the end of the stabilization arm 130 securely latches to the wall-mounted stabilization bracket 150 to stabilize the lifter relative to the wall during transfers. In particular, spring-loaded pin 145 is urged into hole 155 when the three plates of stabilization interface device 140 are properly positioned around the three exposed sides of stabilization bracket 150. This arrangement substantially prevents vertical movement of stabilization arm 130 when the mechanism is attached, but allows rotational movement about pin 135, which permits placement in a variety of positions even where only a single stabilization bracket 150 is available. Multiple stabilization brackets 150 can be placed in different locations to enable stabilized transfers at each one, and several additional variations in configuration will be understood by those skilled in the relevant technology in view of this disclosure.

Figure 6:
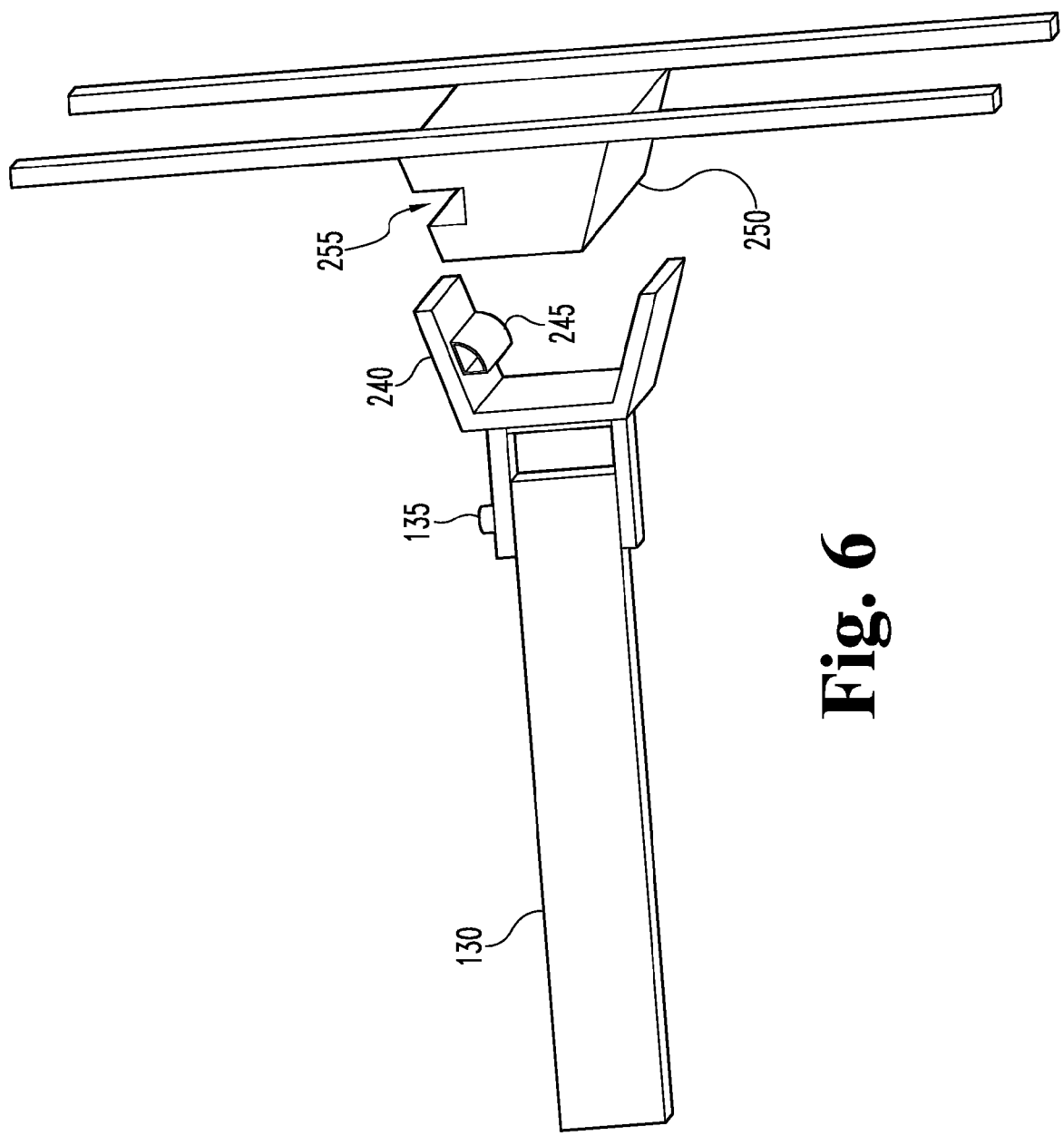
FIG. 6 is a side view of an alternative stabilization mechanism for use with the system of FIG. 1.

FIG. 6 illustrates an alternative stabilization mechanism for use with the disclosed system. In this embodiment, stabilization arm 130 again rotates about pivot pin 135 to enable placement of post 120 in a variety of relative positions. In this attachment mechanism, however, stabilization interface device 240 has a wider opening than that of stabilization interface device 140, and bracket 250 has matching angles between its outer faces. Further, stabilization interface device 240 has stabilization retainer 245, which rests in slot 255 of stabilization bracket 250 when the device is securely in place. Stabilization retainer 245 in some embodiments is fixedly attached to the underside of the top panel of stabilization interface device 240, while in others it is only temporarily secured in position but can rotate up and out of the way as the components are joined, or can be slid into channel 255 from the end of the channel. Alternative placements, forms, arrangements, and even attachment techniques will occur to those skilled in the art based on this disclosure.

Figure 7:
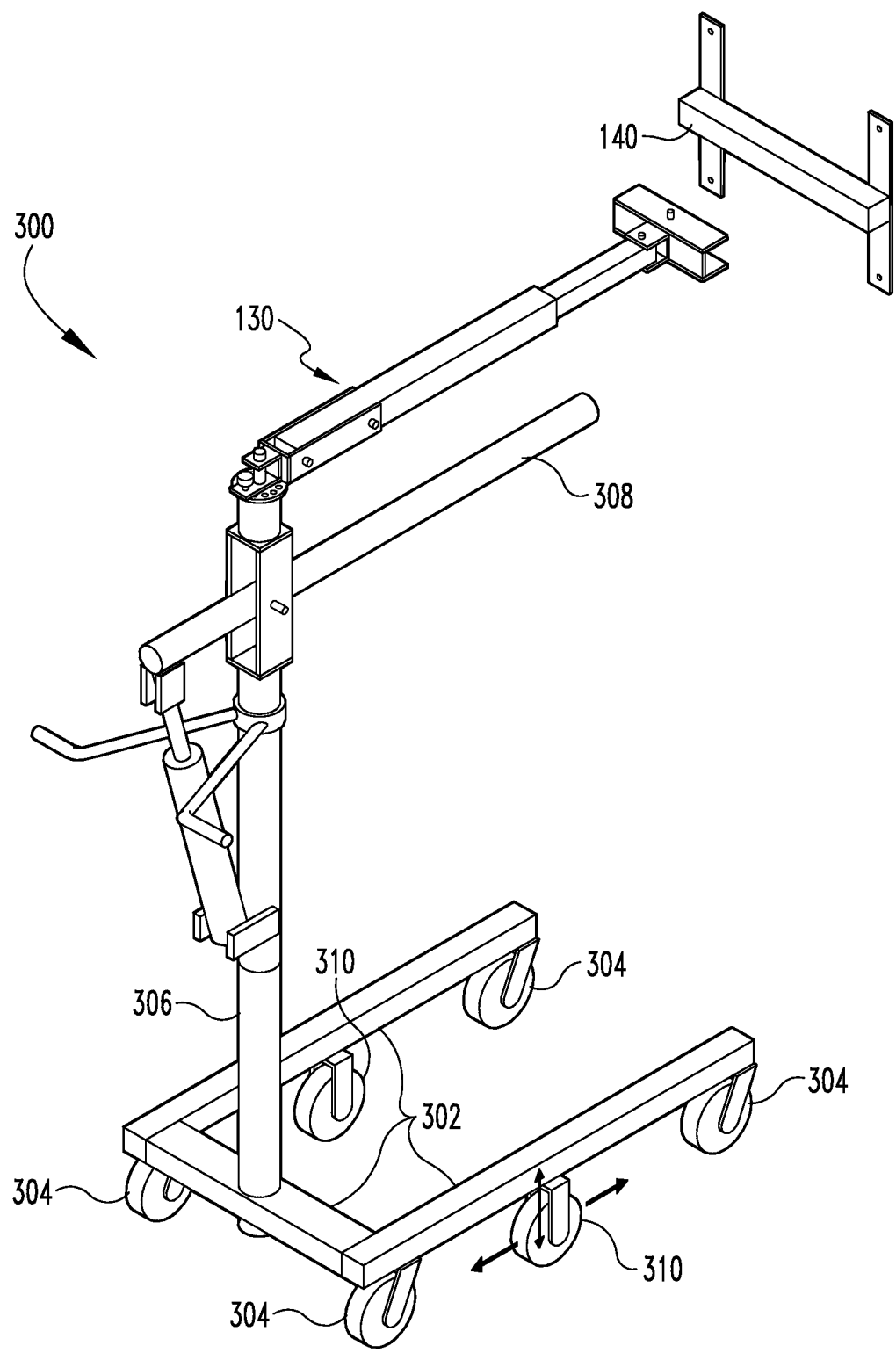
FIG. 7 is a perspective view of another portable patient lifting device according to the present description.

Another embodiment, illustrated in FIG. 7, is a portable patient lifting device 300 normally comprising a base 302 with two front and two rear swiveling casters 304 that provide mobility for the unit, a post 306 vertically attached to the base 302, and a lifter arm 308 rotationally attached to the top of the post 306. The design also has attached to the base 302, between the front and rear casters 304, at least two, but possibly more, adjustable load-bearing drive wheels 310 that do not swivel as casters do. These "load-bearing wheels" 310 are adjustable in height in relation to the bottom of the lifter base 302 and the four casters 304, so the load-bearing wheels 310 can, when desired, be adjusted to be lower in height than the base 302 and casters 304, essentially allowing them to bear more of the load of the lifter system 300 than the four swiveling casters 304 do. When the load-bearing wheels 310 are in this position, this adjustment essentially decreases the load on the axles and swivel bearings of the four casters 304, thereby decreasing the effort required for a person to push or pull the lifter system 300.

An added benefit of the lowered position of the load-bearing wheels 310 is that the lifter 300 is easier for a caregiver to maneuver because it tracks in a more straight line over distances, and turns more easily in confined spaces, such as in situations where a sharp 90-degree turn maneuver is required to go from a hallway through a door, etc. The load-bearing wheels 310 can be raised to allow the lifter 300 to be maneuvered freely in all directions, unlimited by the friction of the load-bearing wheels 310 against the surface, and to allow the four casters 302 to provide maximum stability during transfer of a patient. The adjustment in height of the load-bearing wheels 310 can be accomplished in many ways that will occur to those skilled in the art based on the present disclosure. In one example, the adjustment is accomplished by a rotating cam attached to a lever or some other mechanical device that reliably and easily accomplishes the vertical adjustment of the load-bearing wheels. In other examples, the adjustment is achieved by powered and/or hydraulic-assisted mechanisms.

In some variations of this embodiment, the horizontal position of the load-bearing wheels 310 along the frame of the base 302 can also be adjusted, as illustrated by the non-vertical arrows near wheels 310 in FIG. 7. The adjustment is normally from front-to-back between the four casters 302, allowing the load-bearing wheels 310 to be placed, as necessary or preferred, directly below the center of mass of the lifter. This adjustability allows users to optimize the stability, maneuverability, and versatility of the lifter 300.

Figure 8:
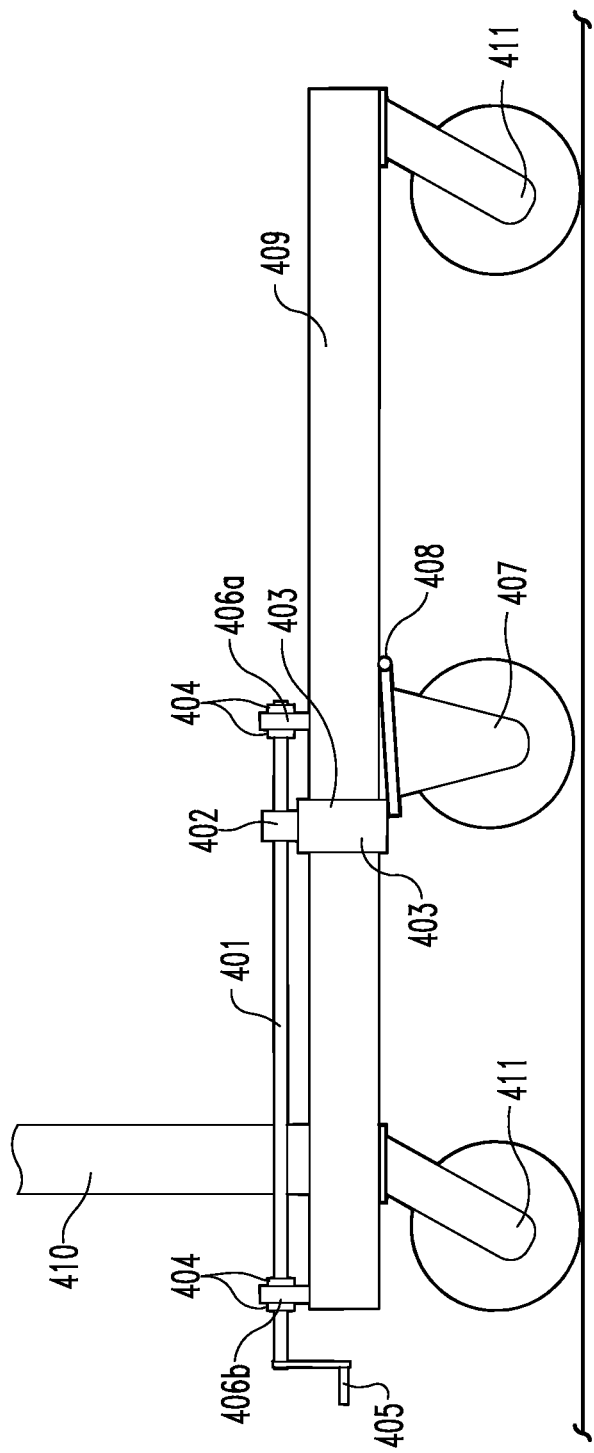
FIG. 8 is a side view of a mobility base with center load-bearing wheels in a third embodiment according to the present description.
Figure 9:
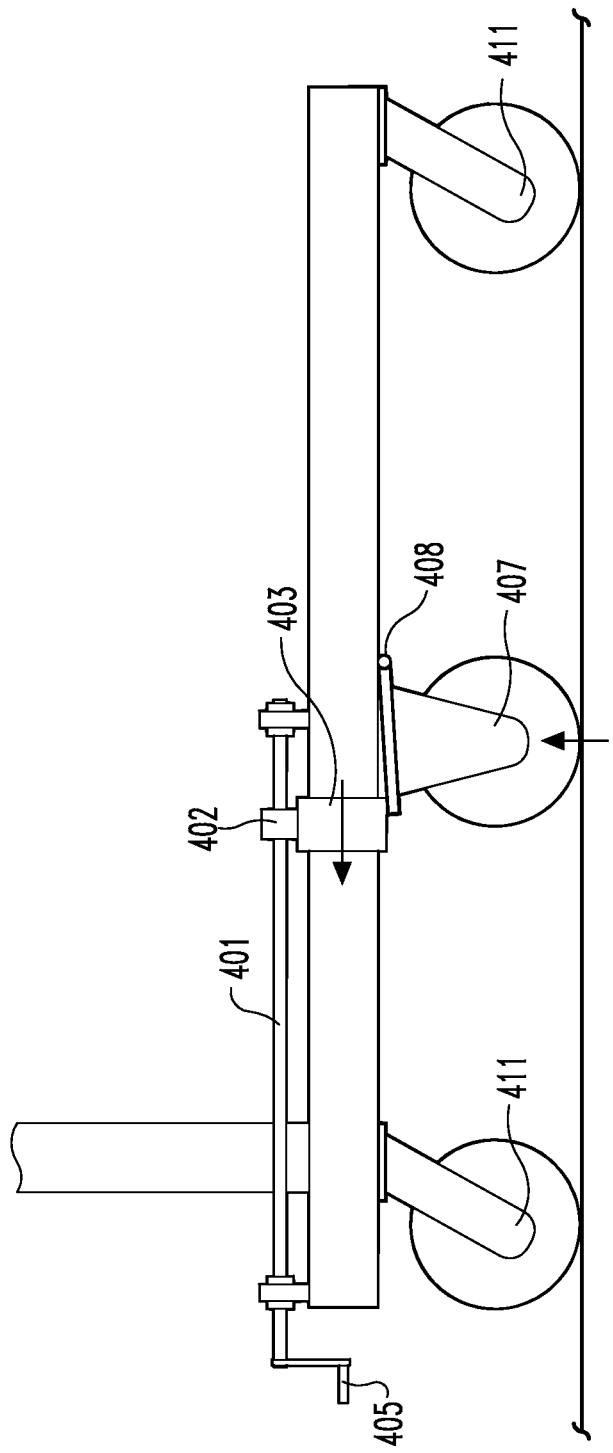
FIG. 9 is a side view of the embodiment of FIG. 8 with its center wheels raised.
Figure 10:
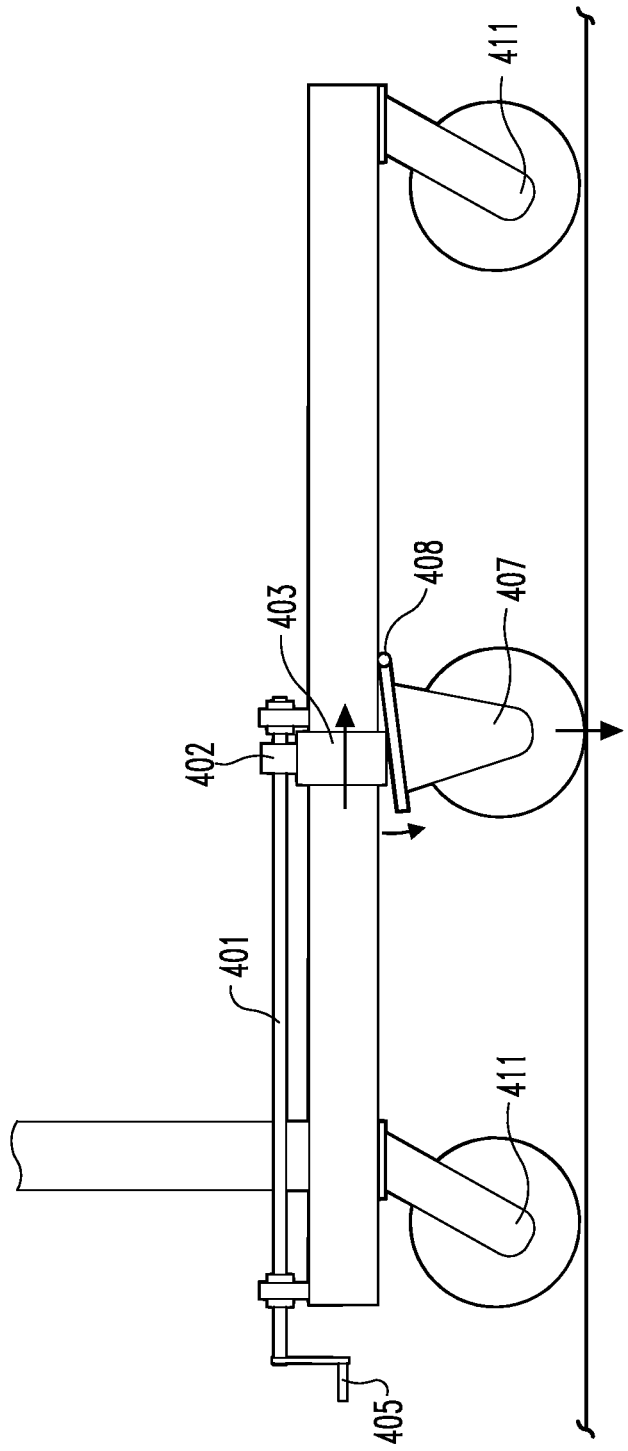
FIG. 10 is a side view of the embodiment of FIG. 8 with its center wheels lowered.

One variation of the placement, operation, and movement of load-bearing wheels 310 is shown in FIGS. 8-10. The front and rear ACME screw posts 406a and 406b are rigidly connected to the top surface of the lifter base. The ACME screw 401 is held in vertical and horizontal alignment by the front and rear ACME screw posts 406a and 406b, and the four shaft collars 404. The ACME screw 401 is allowed to rotate freely through holes drilled in the front and rear screw posts 406a and 406b. The shaft collars 404 prevent the ACME screw from moving horizontally in relation to the ACME screw posts 406a and 406b. As the ACME screw 401 is rotated with the ACME screw crank handle 405, the ACME screw nut 402 and the wedge 403, which are rigidly connected to each other, move back and forth along the lifter base 409. The center load bearing wheel assembly 407 is attached to the underside of the lifter base 409 by a pivot point 408.

The ACME screw nut 402 and wedge 403 are positioned in relation to the load bearing wheel pivot point 408 so that, as the ACME screw nut 402 and wedge 403 are moved back and forth by rotation of the ACME screw 401, the center load bearing wheel assembly 407 moves up (see FIG. 9) and down (see FIG. 10) in relation to the front and rear casters 411. This wedging action effectively offloads the front and rear casters 411, allowing the lifter to be pushed, pulled, and maneuvered much more easily.

In other variations on the lifter of FIG. 1, only two of the wheels are castors, while two others (such as the "rear" wheels on the corners nearest the post) are wheels that are held in fixed orientation relative to the lifter base. This configuration provides somewhat better straight-line tracking than the four-castor version.

While the inventions have been illustrated and described in detail in the drawings and foregoing description, the same is to be considered as illustrative and not restrictive in character, it being understood that the preferred embodiment has been shown and described and that changes and modifications that come within the spirit of the invention are desired to be protected.

What is claimed is:

1. A patient transfer device, comprising:
   a base frame with wheels that contact a support surface and rotate as the patient transfer device is moved across the support surface;
   a post extending upward from the base frame;
   a lift arm extending at least somewhat horizontally from the post;
   a stabilization arm extending from the post; and
   stabilization connector on the stabilization arm, where the connector is removably attachable to a fixture attached to a substantially fixed structural feature of a building;
   wherein all base frame wheels are located within a horizontal wheel distance from the post, and the stabilization arm extends beyond the horizontal wheel distance from the post.

2. The patient transfer device of claim 1, in a kit further comprising the fixture.

3. The patient transfer device of claim 1, wherein the lift arm is configured to rotate in a radial direction about the longitudinal axis of the post while carrying a patient.

4. The patient transfer device of claim 1, further comprising a plurality of castors on the bottom of the base frame.

5. The patient transfer device of claim 4, wherein:
   the base frame forms a rectangle in a substantially horizontal plane; and
   the castors are attached to the bottom of the base frame.

6. The patient transfer device of claim 4, wherein:
the plurality of castors consists of two castors; and
the device further comprises two wheels on the bottom of the base frame.

7. The patient transfer device of claim 4,
further comprising a pair of wheels mounted on the bottom of the base frame,
wherein the height of the bottom of the wheel is adjustable relative to the bottoms of the castors.

8. A method for transferring a person to a destination position in a building, comprising:
placing a movable frame supporting the person in proximity to the destination position, the movable frame including wheels and a post extending upward from the frame, all base frame wheels being located within a horizontal wheel distance from the post;
removably attaching the movable frame to a bracket that has been secured to a structural member of the building, the bracket being located beyond the horizontal wheel distance from the post;
placing the person in the destination position; and
removing the frame from the bracket.

9. The method of claim 8, wherein the bracket is directly secured to a wall.

10. The method of claim 8, wherein the bracket is directly secured to a ceiling.

11. The method of claim 8, wherein the movable frame includes a base with at least two castors on the bottom, the castors each being configured to support the movable frame, roll on a surface, and rotate about a vertical axis.

12. The method of claim 8, wherein the movable frame comprises a lift arm, and the lift arm is configured to rotate in a radial direction about the longitudinal axis of the post.

13. The method of claim 8, wherein
the movable frame comprises a base frame and
a plurality of castors on the bottom of the base frame.

14. The method of claim 13, wherein:
the base frame forms a rectangle in a substantially horizontal plane; and
the castors are attached to the bottom of the base frame.

15. The method of claim 13, wherein:
the plurality of castors consists of two castors; and
the movable frame further comprises two wheels on the bottom of the base frame.

16. The method of claim 13,
the movable frame further comprising a pair of wheels mounted on the bottom of the base frame,
wherein the height of the bottom of the wheel is adjustable relative to the bottoms of the castors.

17. The patient transfer device of claim 1, wherein the stabilization connector is pivotally attachable to the fixture attached to a substantially fixed structural feature of a building.

18. The patient transfer device of claim 3, wherein the stabilization arm is configured to pivot in a radial direction about the longitudinal axis of the post.

19. The patient transfer device of claim 18, wherein the stabilization arm is securely indexed at a discrete number of angles to the post.

20. The patient transfer device of claim 1, wherein the stabilization connector is remotely detachable from the fixture attached to a substantially fixed structural feature of a building.

21. The patient transfer device of claim 1, wherein the stabilization arm is adjustable in length.

22. The patient transfer device of claim 3, wherein the wheels define a wheelbase, and the lift arm is configured to rotate the patient to a location that is outside the wheelbase.

23. The method of claim 8, further comprising:
supporting the person with a lifter arm; and
pivoting the lifter arm while supporting the person and while the movable frame is attached to the bracket.

24. The method of claim 8, further comprising:
supporting the person with a lifter arm; and
moving the center of gravity of the movable frame and the person outside the wheelbase while maintaining the movable frame upright.

25. A patient transfer device, comprising:
a base frame;
a post extending upward from the base frame;
a lift arm extending at least somewhat horizontally from the post;
a stabilization arm extending from the post; and
a stabilization connector on the stabilization arm, where the connector is removably attachable to a fixture attached to a substantially fixed structural feature of a building while carrying a patient;
wherein all base frame wheels are located within a horizontal wheel distance from the post, and the stabilization arm extends beyond the horizontal wheel distance from the post.

26. The patient transfer device of claim 25, further comprising:
wheels that contact a support surface and are attached to the base frame, wherein the wheels define a wheelbase, and wherein the lift arm is configured to rotate the patient to a location that is outside the wheelbase.

* * * * *